United States Patent
Arora et al.

(10) Patent No.: US 10,902,102 B2
(45) Date of Patent: *Jan. 26, 2021

(54) AUTOMATED ABNORMALITY DETECTION IN SERVICE NETWORKS

(71) Applicant: International Business Machines Corporation, Armonk, NY (US)

(72) Inventors: Parul Arora, New York, NY (US); Jonathan A. DeBusk, New York, NY (US); Raphael Ezry, New York, NY (US); Munish Goyal, Armonk, NY (US); Chirdeep Gupta, San Ramon, CA (US); Uri Klein, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/815,256

(22) Filed: Nov. 16, 2017

(65) Prior Publication Data

US 2019/0147148 A1     May 16, 2019

(51) Int. Cl.
| | |
|---|---|
| *H04L 29/06* | (2006.01) |
| *G06F 21/31* | (2013.01) |
| *G06F 21/40* | (2013.01) |
| *G06F 21/57* | (2013.01) |
| *G06F 21/55* | (2013.01) |
| *H04L 29/08* | (2006.01) |

(52) U.S. Cl.
CPC .......... *G06F 21/316* (2013.01); *G06F 21/40* (2013.01); *G06F 21/552* (2013.01); *G06F 21/57* (2013.01); *H04L 63/105* (2013.01); *H04L 63/107* (2013.01); *H04L 63/1408* (2013.01); *H04L 67/22* (2013.01)

(58) Field of Classification Search
CPC .......... H04L 9/00; G11C 7/1009; G06F 17/00
See application file for complete search history.

(56) References Cited

U.S. PATENT DOCUMENTS

| | | | |
|---|---|---|---|
| 9,906,543 B2 * | 2/2018 | Arora ................. | H04L 63/1425 |
| 2015/0365835 A1 * | 12/2015 | Segev ................. | H04W 8/005 |
| | | | 370/252 |

* cited by examiner

*Primary Examiner* — Joseph P Hirl
*Assistant Examiner* — Leynna Truvan
(74) *Attorney, Agent, or Firm* — Garg Law Firm, PLLC; Rakesh Garg; James Nock (57) ABSTRACT

A subsequence of machines used and a cost of providing a subservice in response to a service request with a key is determined. A second cost of using the subsequence of machines to provide the subservice in response to a different service request with a different key is determined. A distance between the cost and the second cost is computed. A value pair is formed using the distance and a number of logged occurrences of the subsequence with the key. The processing of the service request for the key is identified as a suspect for costing an improper computing cost of the service, when an aggregate distance in the value pair fails to exceed a threshold distance.

18 Claims, 6 Drawing Sheets

AUTOMATED ABNORMALITY DETECTION IN SERVICE NETWORKS

TECHNICAL FIELD

The present invention relates generally to a method, system, and computer program product for identifying suspect processing of service requests. More particularly, the present invention relates to a method, system, and computer program product for automated abnormality detection in service networks.

BACKGROUND

A service network is a data processing environment in which the service is collectively provided by different data processing systems providing different portions of the service. For example, if a service has portions A, B, and C, one or more data processing systems provide portion A, one or more other data processing systems provide portion B, and one or more other data processing systems provide portion C, thereby collectively providing service (A,B,C). Service networks by themselves need not be data processing entities but data processing is one part of each node of the networks.

A failure of a service network, or a subservice therein, can occur for a variety of reasons. For example, a subservice may fail due to system-related issues, bugs in network routing, or other suspicious activities. A malicious overutilization, underutilization, or mis-utilization of a subservice is also regarded as a failure of the subservice, a failure of a service network in which the subservice participates, or both.

SUMMARY

The illustrative embodiments provide a method, system, and computer program product for automated abnormality detection in service networks. An embodiment includes a method which includes determining a subsequence of machines used and a cost of providing a subservice in response to a service request with a key; determining a second cost of using the subsequence of machines to provide the subservice in response to a different service request with a different key; computing, using a processor and a memory, a distance between the cost and the second cost; forming a value pair using the distance and a number of logged occurrences of the subsequence with the key; and outputting the processing of the service request for the key as a suspect for costing an improper computing cost of the service, when an aggregate distance in the value pair fails to exceed a threshold distance.

Another embodiment includes a computer program product comprising one or more computer-readable storage devices, and program instructions stored on at least one of the one or more storage devices.

Another embodiment includes a computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

As an example, in a health care network data processing environment, a patient may request a service to treat a broken leg. The service for treating the broken leg may utilize subservices of several departments, which are tracked by their respective data processing systems. The services for treating the broken leg may also be provided by multiple hospitals that do not share a common data processing system and hence the data processing logs cannot be collectively tracked. For example, at one time, a data processing system of a doctor's office records the utilization of the doctor's evaluative and prescription services. At another time, a data processing system of a radiology department records the utilization of the x-ray services. At another time, a data processing system of a surgical department records the utilization of the cast installation services. At another time, the data processing system of the surgical department records the utilization of the cast removal services. At another time, a data processing system of a physical therapy department records the utilization of the rehabilitative therapy services.

In the same hospital data processing environment, numerous other services may utilize the services of the doctor, radiology, surgical, therapy, and many other departments. Furthermore, different patients requesting the same service, e.g., the treatment of broken legs, may utilize more or less amount of a particular subservice, or may utilize a particular subservice more than once, in a different order, or at different times in the provision of their requested service. Accordingly, the data processing systems of the departments that provide the subservices may record different data in the provision of those subservices.

Furthermore, the hospital may provide numerous other services, not just the treatment of broken legs. Such other services may also utilize some or all of the subservices that are utilized in the treatment service for broken legs. Different hospitals or health care providers on a network who provide various services may not share private patient related information with each other.

The data processing systems of the departments or health care providers log the information about the subservice provided in the provision of a particular requested service. The log file of a data processing system provides the information about where the data processing system received the request for the subservice, a value of the service provided, and where the data processing system sent the service request next for the next subservice. For example, in the broken leg case, the data processing system of the radiology department may include a log entry, which indicates that the request for the radiology subservice came from the data processing system of the data processing system of the doctor's office; the radiology subservice consumed x amount of time, y kind of specialized procedure, and z cost items; and the data processing system of the radiology department sent the service request to the data processing system of the surgical department.

Other data processing systems of other departments may include log entries fashioned in a similar manner but containing different information. Even data processing system of the radiology department may include log entries fashioned in a similar manner but containing different information. As can be seen, each data processing system of each department may contain differing log information about providing the same subservice depending upon the circumstances.

Service networks are employed in many other environments other than the healthcare example above. Service networks are commonly used in collaborative computing, information processing networks, and other service delivery environments, including cloud computing environments.

For example, consider again the healthcare service network example for providing a treatment service for a broken leg. Suppose that a patient requesting the service for treating the broken leg causes a data processing system of a doctor's office to record the utilization of the doctor's evaluative and prescription services at a first time. At a next time, a data processing system of a surgical department records the utilization of the cast installation services. Thereafter, a data processing system of a radiology department records the utilization of the x-ray services. At the next time, a data processing system of a physical therapy department records the utilization of the rehabilitative therapy services. Following that time, the data processing system of the surgical department records the utilization of the cast removal services. Thereafter, the data processing system of the radiology department again records the utilization of the x-ray services. Following that time, the data processing system of the surgical department again records the utilization of the cast removal services. Thereafter, the data processing system of the physical therapy department again records the utilization of the rehabilitative therapy services.

As can be seen, in the above example, certain subservices appear to have been misused by using them in an incorrect sequence, using them repeatedly, or both. The illustrative embodiments recognize that such misuse can result not only in the increased cost of providing the service, but also in the service provision becoming sub-optimal. In this example, a health insurance claim for the misused service is likely to also misuse the insurance policy for unnecessary procedures.

The illustrative embodiments recognize that the problem becomes unmanageable, and extremely difficult to determine in a reasonable time before a harmful consequence of the misuse, even with a small number of subservices but a sufficiently large number of service requests. When the service network becomes complex—including hundreds or even thousands of subservices—as is often the case in collaborative computing, it becomes humanly impossible to timely detect service network errors. The non-disruptive and abusing service network errors are particularly difficult to detect on the fly as service requests are processed, without adversely affecting the performance of the data processing systems providing the subservices.

The illustrative embodiments used to describe the invention generally address and solve the above-described problems and other problems related to managing projects that are related to detecting errors in service networks. The illustrative embodiments provide a method, system, and computer program product for automated abnormality detection in service networks.

An embodiment can be implemented as a software application. The application implementing an embodiment can be configured as a modification of an existing processing application, as a separate application that operates in conjunction with an existing processing application, a stand-alone application, or some combination thereof.

A processing application is a software application that provides a subservice by executing on a data processing system, or machine, in a service network. A local log is a file or other suitable repository of log data produced as a result of executing the processing application on the machine. In other words, the local log is machine-specific, provides log data of only the subservice performed by that machine, and does not provide an end-to-end view of the service that is provided by the service network as a whole. The log data in a local log is arranged in the form of log entries.

In one embodiment, a log entry of a machine contains at least three pieces of information. The first piece of information in a log entry is an identification of a user (hereinafter referred to as a "key"). The key is unique within the service network and only services or subservices consumed by the user associated with the key are logged with that key being a part of the log data. A user can be a human, a data processing system, an application, or some combination thereof.

The second piece of information in the log entry is a subsequence. A subsequence is sufficient to identify (i) an originating machine from which a request for the subservice of the machine was received at the machine and (ii) a termination machine to which the machine sent the service request for further processing, such as for another subservice. For example, suppose that machines m0, m1, m2, and m3 are four machines in a service network. Machine m0 provides subservice A, m1 provides subservice B, m2 provides subservice C, and m3 provides subservice D. The subsequence in a log entry in a local log of m3 may be [m0,m3,m1], meaning, a service request was received from m0, processed at m3, and sent to m1. Any type of machine identifiers can be arranged in a subsequence in this manner.

A third piece of information in the log entry is a service value. A service value is a set of one or more values, each value representing an aspect of measuring the subservice provided by the machine for the service request made by the user of the key. Some non-limiting examples of a service value include a "service time" which is a measurement of an amount of time spent in providing the subservice for the request of the key; a "service effort" which is an amount of effort-measured in any suitable manner—spent in providing the subservice for the request of the key; a "service cost" which is a measurement of an cost—measured in any suitable manner—incurred in providing the subservice for the request of the key; or some combination of one or more of these and other similarly purposed values.

A non-limiting example of a service effort is an amount of wear and tear attributed to the provision of the subservice.

A non-limiting example of a service cost is an amount of computing resource expended or allocated to provide the subservice for a request.

An embodiment queries the local logs of one or more machines in the network that provided one or more corresponding subservices. A queried machine responds with the logged values if the logged values are available at the machine. The embodiment uses these values to determine whether the processing of a particular service request is normal or abnormal. Normal processing of a service request means (i) a likelihood that a sequence of machines used to process the request is similar within a tolerance with the sequences of other processing of other requests using those machines, (ii) a likelihood that a service value in providing a certain subservice according to the request is similar within a tolerance with the service values in other processing of other requests using that subservice, (iii) a likelihood that a log entry in providing certain subservices according to the request is similar within a tolerance with the log entries in other processing of other requests using those subservices, or some combination of one or more of (i), (ii), and (iii).

The processing of a particular service request is abnormal when the processing of the particular service request is not normal as described above. An abnormal processing is a suspect in causing an actual or possible service network error at a past time, a present time, at a future time, or some combination thereof. When an embodiment identifies a processing of a service request, or a part of that processing, as abnormal, the processing or the part thereof is selected for further investigation.

An embodiment selects a machine (e.g., m3) used for providing a subservice in a service request associated with a key (e.g., k). The embodiment extracts from the local log of the machine those log entries (Lk) where the machine has provided the subservice corresponding to the key.

The embodiment selects an extracted log entry (Lk1) from Lk, and identifies a subsequence in that log entry (Sk). The embodiment further extracts from the local log, a set of log entries (Ls) where the same subsequence Sk appears with other keys.

For Lk1, an embodiment computes a distance between a service value (Vk1) and a service value in a log entry in Ls (e.g., Vs1). Suppose the distance (D) between Vk1 and Vs1 is called D11. The embodiment computes the distances D11 . . . D1$n$ for the n log entries in Ls. A distance between service values is indicative of a difference between the service values for providing the same subservice to the user with key k and other users associated with other keys. In one embodiment, the distance D1$x$ is equal to an absolute value of the subtraction (Vk1–Vsx).

An embodiment applies a weight (W) to each distance computed in this manner. The weight is indicative of a relevance of other log entries to Lk1 in determining whether Lk1 is normal. In one embodiment, the weight is a function of the distance, e.g., the greater the distance D1$x$ the smaller the weight—meaning, the more the difference between the service values, the less the Lsx is relevant for determining whether Lk1 is normal.

Thus, the embodiment computes a weighted distance of Vk1 for Sk of Lk1. Continuing in this manner, the embodiment computes the weighted distances of other occurrences of Sk in Lk, such as with respect to Vk2 . . . Vkm of m log entries with key k using the sequence Sk.

A value pair is (a number of occurrences of Sk in Lk with value Vk1, and a total weighted distance of Vk1 from all Vsx). Assuming that only Lk1 has Vk1, the numerosity of occurrences of Sk in Lk with value Vk1 is 1. If more than one log entries in Lk had the service value Vk1, that numerosity will be that number of log entries.

A total weighted distance of Vk1 from Vsx is a sum of the weighted distances of Vk1 from each Vsx. For example, suppose that Vk1 were 1, and Ls included 5 log entries with:

Vs1=0, Vs2=4, Vs3=1, Vs4=10, Vs5=2.

Distance D11=(Vk1–Vs1) would be 1, distance D12=(Vk1–Vs2) would be 3, distance D13=(Vk1–Vs3) would be 0, distance D14=(Vk1–Vs4) would be 9, and distance D15=(Vk1–Vs5) would be 1.

Accordingly, assume as a non-limiting example that weight of distance D11 could be 0.5, weight of distance D12 could be 0.2, weight of distance D13 could be 0.9, weight of distance D14 could be 0.01, and weight of distance D15 could be 0.2.

Thus, weighted distance D11 would be 1*0.5=0.5;

weighted distance D12 would be 3*0.2=0.6;

weighted distance D13 would be 0*1=0;

weighted distance D14 would be 9*0.01=0.09; and weighted distance D15 would be 1*0.5=0.5.

The total weighted distance of Vk1 is:

0.5+0.6+0+0.09+0.5=1.69.

The value pair for Sk is therefore, (5, 1.69).

An embodiment outputs a logarithm of the value pair for Sk as (log(number of occurrences of Sk in Lk with value Vk1), and log(a total weighted distance of Vk1 from all Vsx)). In the above example, the value pair becomes:

(log(5), log(1.69)).

The logarithm can be to any suitable Base value, such as log Base 10.

Thus, an embodiment has produced three values for a particular subsequence of processing for a particular request at a particular machine –key k, log(number of occurrences of Sk in Lk with value Vk1), and log(a total weighted distance of Vk1 from all Vsx). In this manner, the embodiment produces an aggregate of these values across all the machines by transmitting them over the network and summing them based on the matching keys, and producing three values for a processing of a request of the user with key k, namely, (i) k (ii) cumulative count value=(sum of all (log(number of occurrences of all sequences used by k in all local logs of all machines used by k and with all service values)) and (iii) cumulative aggregated weighted distance=(sum of all (log(all total weighted distances of all service values used by k from all comparable service values using other keys in all local logs of those machines that k used))

An embodiment further uses a threshold count value. If the cumulative count value exceeds the threshold count value, the embodiment determines that the processing of service requests of k is normal for using an acceptable sequence. Otherwise, the embodiment determines that the processing of service requests of k is abnormal for using an unusual or unacceptable sequence.

An embodiment further uses a threshold distance. If the cumulative aggregated weighted distance exceeds the threshold distance, the embodiment determines that the processing of service requests of k is normal for having an acceptable service value. Otherwise, the embodiment determines that the processing of service requests of k is abnormal for not having an acceptable service value.

An embodiment further uses a threshold count value and a threshold distance. If the cumulative count value exceeds the threshold count value, and the cumulative aggregated weighted distance exceeds the threshold distance, the embodiment determines that the processing of service requests of k is normal for creating acceptable log entries. Otherwise, the embodiment determines that the processing of service requests of k is abnormal for creating unusual or unacceptable log entries.

A method of an embodiment described herein, when implemented to execute on a device or data processing system, comprises substantial advancement of the functionality of that device or data processing system in automated abnormality detection in service networks. For example, presently available methods of identifying abnormal processing in a service network are unable to identify abnormal processing in a comparative manner using other processing, while the service network is operational. An embodiment provides a method for rapid comparison of one service request processing with other processing in the service network to output a limited amount of data for analysis, to wit, the three values for a processing of a request of the user with key k. The computation of these values imposes negligible load on the machines participating in the processing, and the illustrative embodiments are able to determine the normality or abnormality of the processing on the fly. An embodiment automatically, and without human intervention, also adapts to the changing processing as the service network evolves. By determining the normality or abnormality in the described manner, an embodiment progressively adjusts a previously abnormal processing, which becomes prevalent in servicing of more and more requests over time. This manner of detecting abnormal service request processing in service networks is unavailable in the presently available methods. Thus, a substantial advancement of such devices or data processing systems by executing a method of an embodiment is in enabling on the fly detection of abnormal processing with minimal additional workload on the machines operating in the service network.

The illustrative embodiments are described with respect to certain keys, services, subservices, machines, log entries, sequences, subsequences, distances, weights, methods of aggregation, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
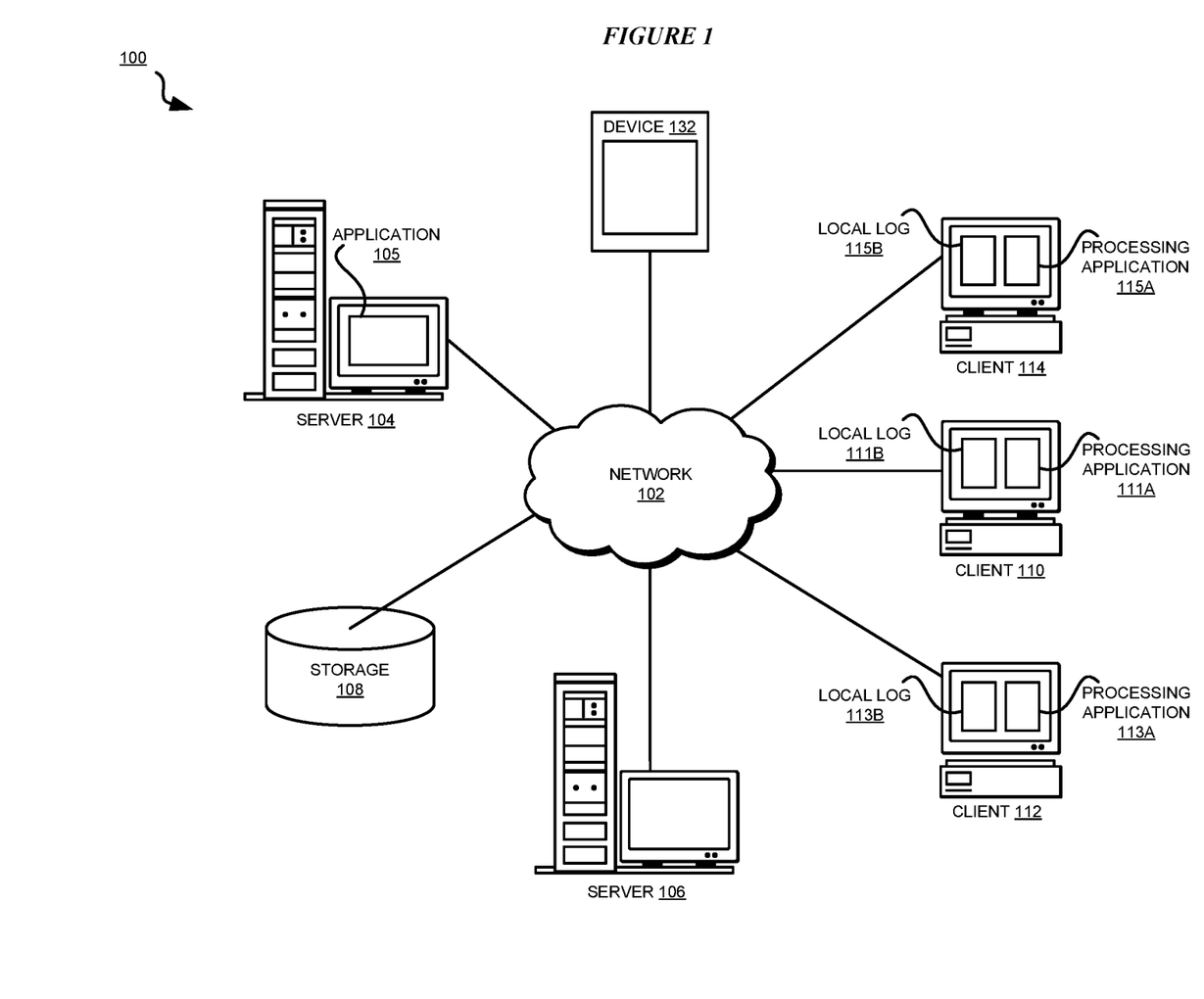
FIG. 1 depicts a block diagram of a network of data processing systems in which illustrative embodiments may be implemented.
Figure 2:
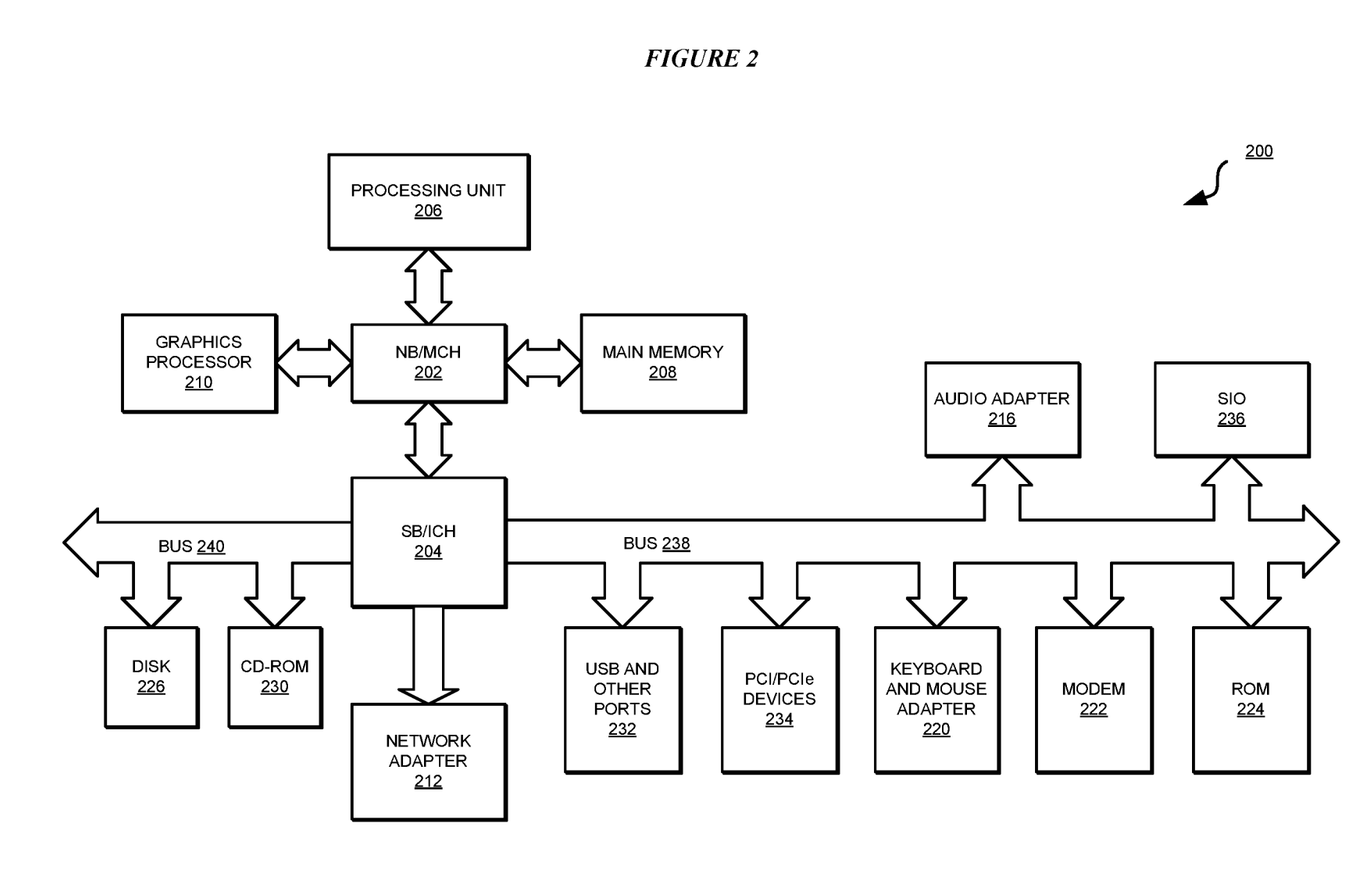
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. For example, suppose that a service network comprises machines 110, 112, and 114. Machine 110 includes processing application 111A, which provides a subservice, and local log 111B. Similarly, machine 112 includes processing application 113A, which provides another subservice, and local log 113B. Machine 114 includes processing application 115A, which provides another subservice, and local log 115B. Machine 104 may or may not be a part of the service network. In one embodiment, application 105 extracts the log entries from local logs 111B, 113B, and 115B, and performs the computations and the normalcy determination at machine 104. In another embodiment (not shown), application 105 modifies processing 111A, or otherwise causes another process (not shown) on machine 110, to process the log entries from local log 111B, such that the three values are produced at machine 110 and sent to application 105 at machine 104. In a similar manner (not shown), application 105 modifies processing 113A and 115A, or causes other processes, to process the log entries from local log 113B and 115B, respectively on machines 112 and 114, respectively. The three values are produced at machine 112 and 114 in a similar manner and sent to application 105 at machine 104. Application 105 makes the determination of abnormality using one or more thresholds as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG.

2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
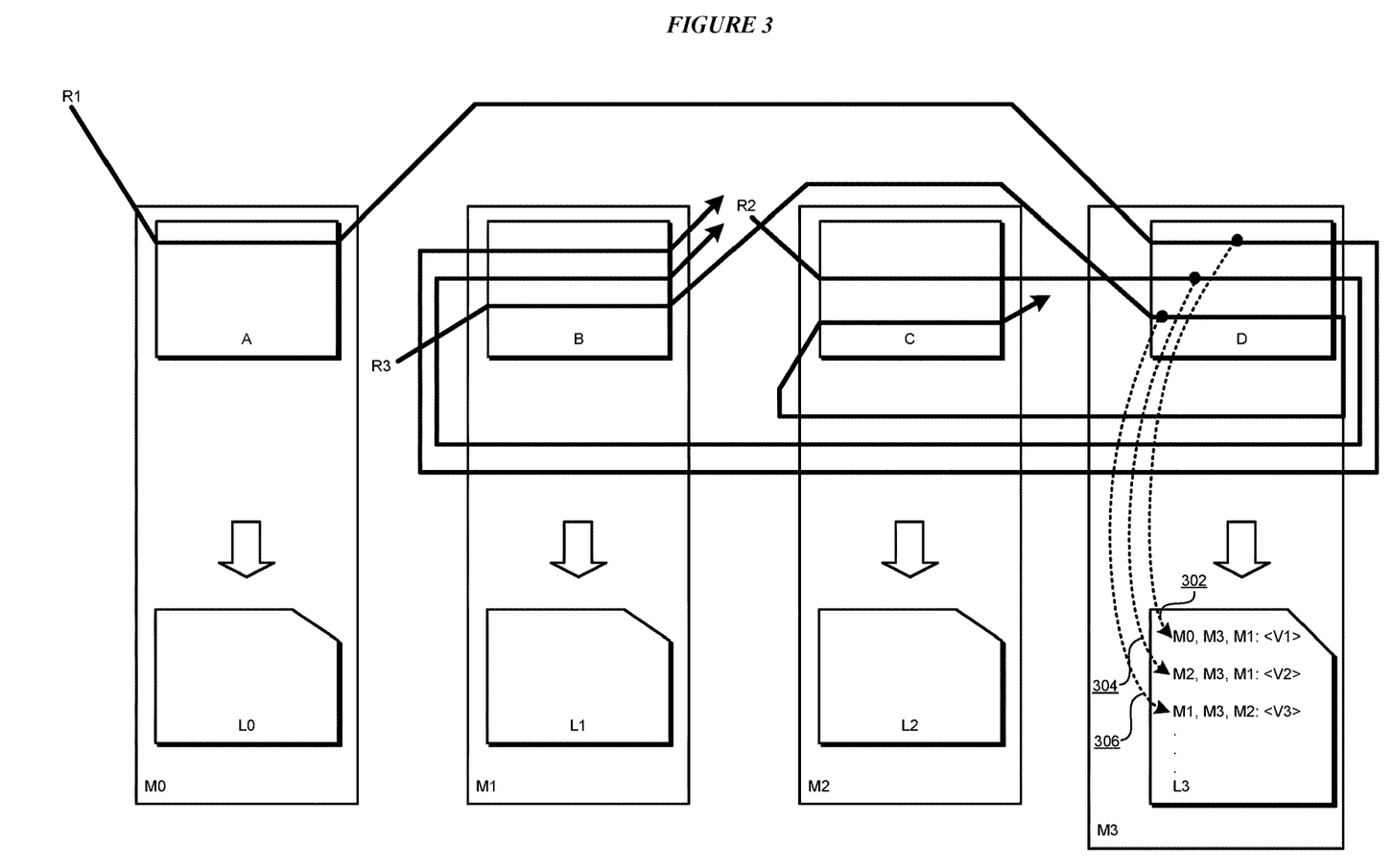
FIG. 3 depicts a block diagram of an example configuration for automated abnormality detection in service networks in accordance with an illustrative embodiment.

With reference to FIG. 3, this figure depicts a block diagram of an example configuration for automated abnormality detection in service networks in accordance with an illustrative embodiment. Machines m0, m1, m2, and m3 are each an example of any of machines 110, 112, or 114 in FIG. 1. Machine m0 includes processing application A and local log L0. Machine m1 includes processing application B and local log L1. Machine m2 includes processing application C and local log L2. Machine m3 includes processing application D and local log L3.

Service requests R1, R2, and R3 are the requests from a user associated with a key k1. Service request R1 uses subservices A, D, and B, in that order. Service request R2 uses subservices A, D, and B, in that order. Service request R1 uses subservices C, D, and B, in that order. Service request R3 uses subservices B, D, and C, in that order.

Assume that application 105 begins the evaluation as described herein at machine m3. The processing in m3 causes log entries 302, 304, and 306 in local log L3. Particularly, log entry 302 pertains to the processing of request R1 through m3, and provides that m3 received the processing request for R1 from mo, processed at m3, and sent for further processing at m1 (m0,m3,m1). Log entry 302 further provides that the service value of the providing subservice D to R1 was v1.

Similarly, log entry 304 pertains to the processing of request R2 through m3, and provides that m3 received the processing request for R2 from m2, processed at m3, and sent for further processing at m1 (m2,m3,m1). Log entry 304 further provides that the service value of the providing subservice D to R2 was v2.

Similarly, log entry 306 pertains to the processing of request R3 through m3, and provides that m3 received the processing request for R3 from m1, processed at m3, and sent for further processing at m2 (m1,m3,m2). Log entry 306 further provides that the service value of the providing subservice D to R3 was v3.

Figure 4:
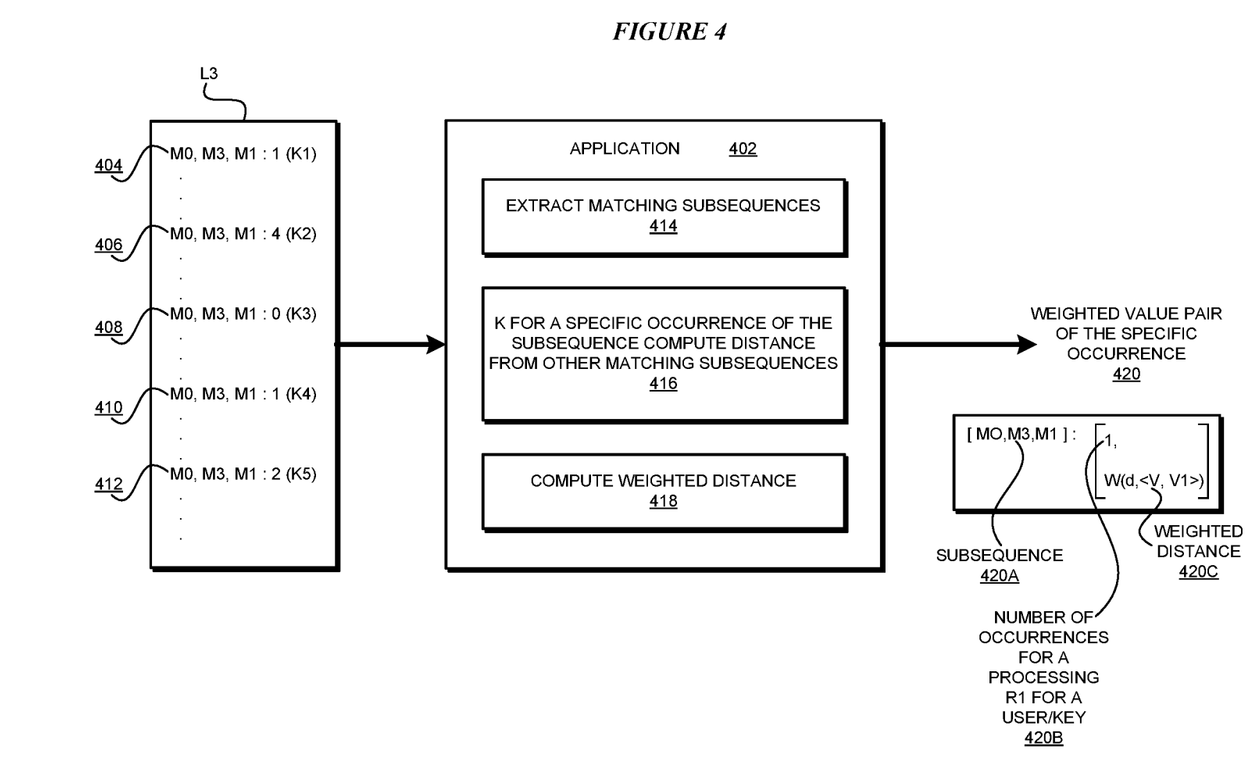
FIG. 4 depicts a block diagram of a portion of an example process or automated abnormality detection in service networks in accordance with an illustrative embodiment.

With reference to FIG. 4, this figure depicts a block diagram of a portion of an example process or automated abnormality detection in service networks in accordance with an illustrative embodiment. Local log L3 is the same local log L3 in FIG. 3. Application 402 is an example of application 105 in FIG. 1.

Consider, as a continuation of the example used in FIG. 3, that sequence (m0,m3,m1), which is used in the processing of service request R1 for the user with key k1, is of interest for determining whether R1 by k1 is abnormal. Because the processing of R1 may in fact use many more machines, sequence (mo,m3,m1) is really only a subsequence of the overall sequence of machines utilized for processing R1.

Log entry 404 in L3 is for key k1, and shows this subsequence with an example service value of 1. Log entry 406 in L3 is for key k2, and shows this subsequence with an example service value of 4. Log entry 408 in L3 is for key k3, and shows this subsequence with an example service value of 3. Log entry 410 in L3 is for key k4, and shows this subsequence with an example service value of 1. Log entry 412 in L3 is for key k5, and shows this subsequence with an example service value of 2. Many entries can similarly exist in L3 from the processing of various requests from various users, where subsequence (m0,m3,m1) is used. Many entries (not shown) can also exist in L3 from the processing of various requests from various users, where a different subsequence is used.

Component 414 extracts log entry 404 corresponding to k1 and identifies subsequence (m0,m3,m1). Component 414 extracts log entries 406, 408, 410, and 412 from L3 because they use the same subsequence.

Component 416 computes the distances between the service values of log entry 404 and the service values of each of log entries 406, 408, 410, and 412. Component 418 applies a weight corresponding to a computed distance according to a suitable weighting algorithm. Component 418 thus computes a weighted distance between the service value of log entry 404 and the service values of each of log entries 406, 408, 410, and 412.

Application 402 outputs weighted value pair 420 corresponding to the occurrence of subsequence (m0,m3,m1) in log entry 404. As the example depiction shows, weighted value pair 420 is for subsequence 420A; the occurrence of subsequence 420A in the processing of R1 for k1 has numerosity 420B of 1; and has weighted distance 420C with other occurrences of subsequence 420A for other keys. In weighted distance 420B, v represents a service value of any of log entries 406-412, v1 represents the service value of log entry 404, d represents the distance between v and v1, and w represents the weight corresponding to d.

Figure 5:
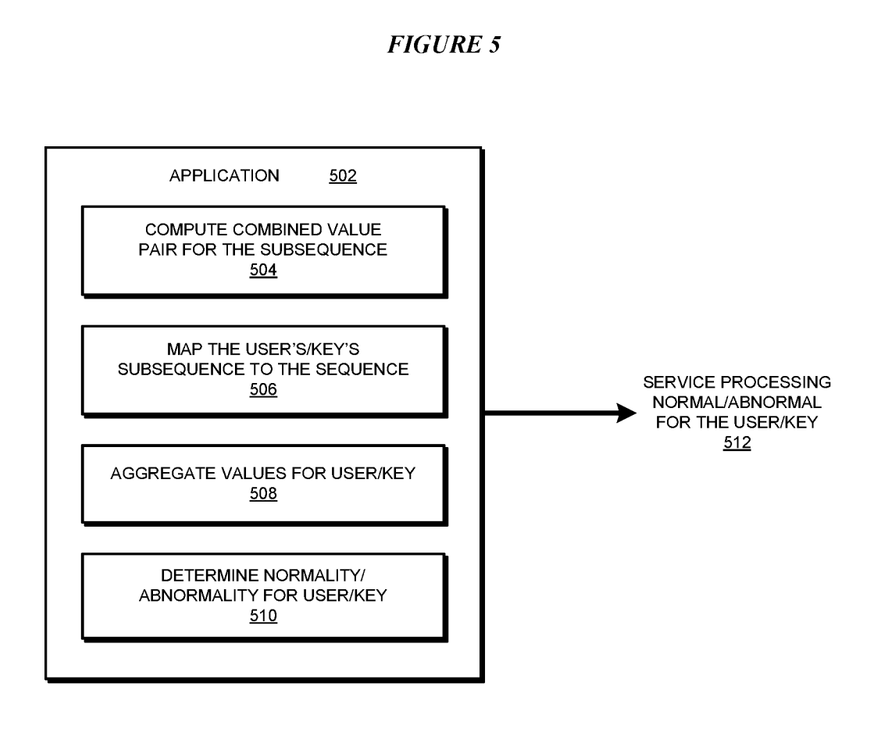
FIG. 5 depicts a block diagram of another portion of a process for automated abnormality detection in service networks in accordance with an illustrative embodiment.

With reference to FIG. 5, this figure depicts a block diagram of another portion of a process for automated abnormality detection in service networks in accordance with an illustrative embodiment. Application 502 builds upon application 402 in FIG. 4.

Continuing from the operation described in FIG. 4, component 504 computes a combined value pair for the subsequence identified in log entry 404, to wit, (mo,m3,m1). For example, as described herein, component 504 computes a logarithm of the count as one part of the value pair for the subsequence and the logarithm of the aggregate weighted distance as the other part of the value pair for the subsequence.

Component 506 maps the subsequence to the overall sequence corresponding to a particular service request processing for the key. For example, subsequence (mo,m3,m1) may be a part of the sequence (mo,m3,m1,m2,m3,m1,m3, m2). The computed value pair of the subsequence is a part of the value pair of the overall sequence according to this mapping.

Component 508 computes the cumulative values for the value pair of the entire sequence for the particular service request processing for the key. For example, as described herein, component 508 computes the sum of all (logarithm of counts) and the sum of all (logarithm of all weighted distances).

Component 510 compares one or both cumulative values from the value pair of the entire sequence with the corresponding one or more thresholds. For example, component 510 determines whether the cumulative count value exceeds a threshold count value to determine whether the processing of service request R1 of k1 is normal or abnormal for using the sequence. As another example, component 510 determines whether the cumulative weighted distance exceeds a threshold distance to determine whether the processing of service request R1 for k1 is normal or abnormal for having a particular service value in a particular machine.

In one example operation of an embodiment, when a processing task has to be inspected for abnormalities, the embodiment sends a query with the task identifier through the network. The data processing system of each node of the network listens to these broadcast identifiers. If the identifier is found to be present in a listening machine's logs, that machine computes the likelihood as described herein, and sends it back to the embodiment along with the identifier. The embodiment accumulates all the response from each node of the network for a given identifier, aggregates, computes the overall likelihood, and decides whether the processing task associated with the identifier is normal or abnormal based on the threshold values.

Figure 6:
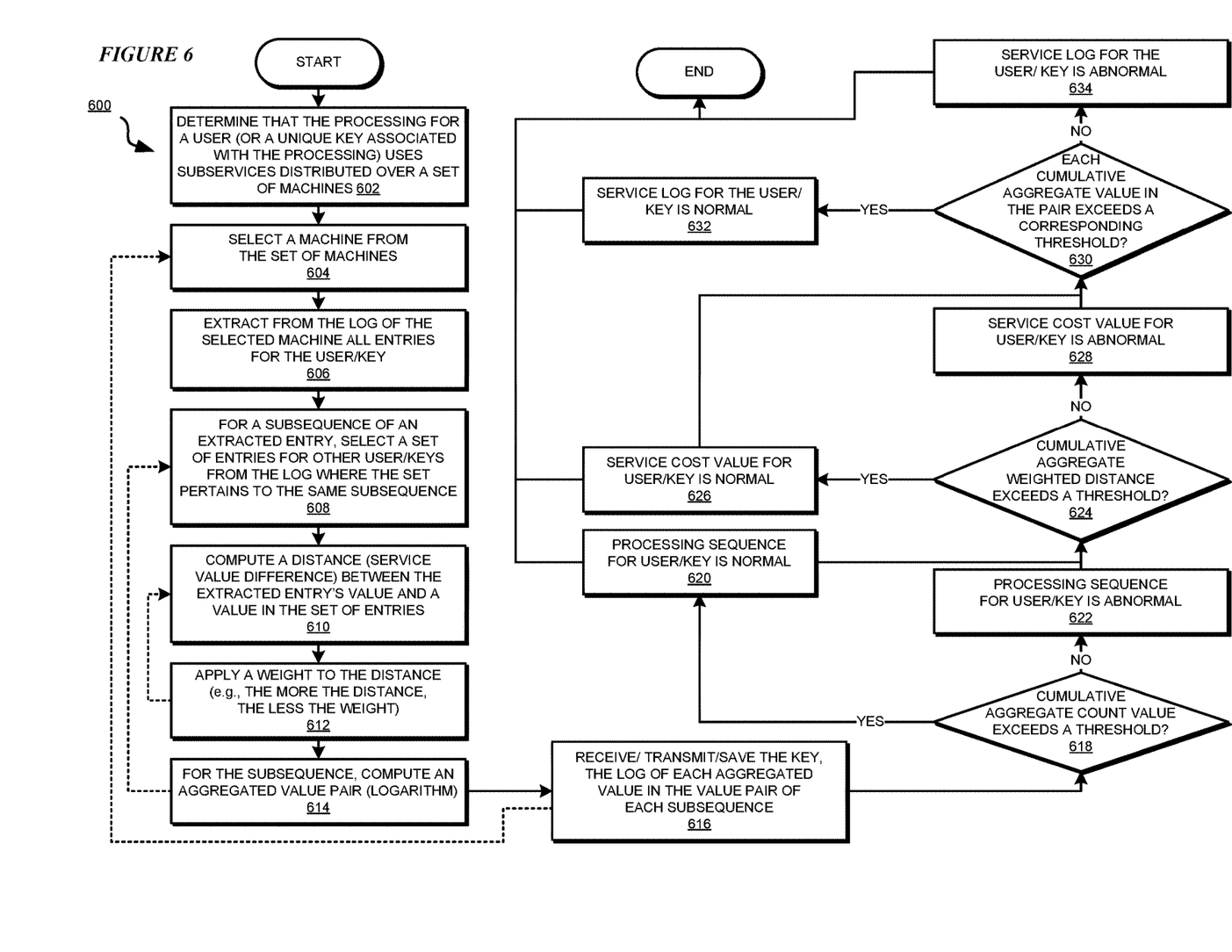
FIG. 6 depicts a flowchart of an example process for automated abnormality detection in service networks in accordance with an illustrative embodiment.

With reference to FIG. 6, this figure depicts a flowchart of an example process for automated abnormality detection in service networks in accordance with an illustrative embodiment. Process 600 can be implemented in application 502 in FIG. 5.

The application determines that the processing of a service request for a user—associated with a key—uses subservices distributed over a set of machines (block 602). The application selects a machine from the set of machines (block 604).

The application extracts from the local log of the selected machine all entries associated with the key (block 606). For a subsequence identified in an extracted entry, the application selects a set of log entries from the local log where the entries in the set also include the subsequence for other keys (block 608).

The application computes a distance between the service value of the extracted entry with the subsequence and the service values of a member entry of the set (block 610). The application applies a weight to the distance, the weight being a function of the distance (block 612). The application repeats block 610 and 612 for each member of the set of entries.

The application computes, for the subsequence, an aggregate value pair (block 614). The application repeats blocks 608-614 for each subsequence used in association with the key of block 602.

The application receives from the selected machine, transmits from the selected machine, or saves from the selected machine, the key and the logarithm of each aggregated value in the value pair of each subsequence (block 616). The application repeats blocks 604-616 for each machine participating in processing the service request for the key.

The application determines whether the cumulative aggregate count value exceeds a threshold count value (block 618). If the cumulative aggregate count value exceeds the threshold count value ("Yes" path of block 618), the application concludes that the processing sequence for the key is normal (block 620). The application may end process 600 thereafter, or proceed to block 624. If the cumulative aggregate count value does not exceed the threshold count value ("No" path of block 618), the application concludes that the processing sequence for the key is abnormal (block 622).

The application determines whether the cumulative aggregate weighted distance exceeds a threshold distance value (block 624). If the cumulative aggregate weighted distance exceeds the threshold distance value ("Yes" path of block 624), the application concludes that the service cost in the processing for the key is normal (block 626). The application may end process 600 thereafter, or proceed to block 630. If the cumulative aggregate weighted distance does not exceed the threshold distance value ("No" path of block 624), the application concludes that the service cost in the processing for the key is abnormal (block 628).

The application determines whether the cumulative aggregate count value and the cumulative aggregate weighted distance each exceeds a corresponding threshold value (block 630). If each cumulative aggregate value exceeds the corresponding threshold value ("Yes" path of block 630), the application concludes that the service log in the processing for the key is normal (block 632). The application ends process 600 thereafter. If each cumulative aggregate value does not exceed the corresponding threshold value ("No" path of block 630), the application that the service log in the processing for the key is abnormal (block 634). The application ends process 600 thereafter.

Thus, a computer implemented method, system or apparatus, and computer program product are provided in the illustrative embodiments for automated abnormality detection in service networks. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a subsequence of machines used and a cost of providing a sub service in response to a service request with a key;
   determining a second cost of using the subsequence of machines to provide the subservice in response to a different service request with a different key;
   computing, using a processor and a memory, a distance between the cost and the second cost, wherein the computing is executed while the subservice is operational;
   forming a value pair using the distance and a number of logged occurrences of the subsequence with the key;
   outputting the processing of the service request for the key as a suspect for costing an improper computing cost of the service, when an aggregate distance in the value pair fails to exceed a threshold distance;
   evaluating whether an aggregate number in the value pair exceeds a threshold count, the aggregate number using the number; and
   outputting as the suspect, responsive to the evaluating being negative, the processing of the service request for the key, for using an improper sequence of machines during the provisioning of the service and causing an error.

2. The method of claim 1 further comprising:
   outputting as the suspect, when the aggregate distance fails to exceed the threshold distance and the aggregate number fails to exceed the threshold count, for forming an improper entry in the log during the provisioning of the service and causing an error.

3. The method of claim 1, further comprising:
   computing using another number and another distance, another value pair for another subsequence used in the processing of the service request for the key;
   combining the number and the other number to form the aggregate number; and
   combining the distance and the other distance to form the aggregate distance.

4. The method of claim 1, further comprising:
   applying, as a part of computing the value pair for the subsequence, a logarithm function to the number and the distance.

5. The method of claim 1, further comprising:
   applying a weight to the distance.

6. The method of claim 5, wherein the weight is a function of the distance.

7. The method of claim 1, further comprising:
   further computing a set of distances between the cost and each cost associated with each entry in the set of entries, wherein the distance is an absolute value of a subtraction function using two costs, the set of distances including the distance.

8. The method of claim 7, further comprising:
   computing the aggregate distance using the set of distances.

9. The method of claim 1, further comprising:
   determining that providing the service uses a set of subservices, the set of subservices including the subservice, each subservice in the set being provided at a different machine in a set of machines, the set of machines including the machine, and each machine in the set of machines producing a corresponding log.

10. The method of claim 1, wherein the log of the machine provides information about only a portion of the processing, the portion comprising a source machine identifier, an identifier of the machine, a target machine identifier, and the cost, wherein the source machine identifier, the identifier of the machine, and the target machine identifier together form the subsequence, the subsequence being a part of a sequence of using machines from a set of machines in processing the service request.

11. The method of claim 1, wherein the processor and the memory are in the machine.

12. The method of claim 1, wherein the processor and the memory are in a different machine.

13. A computer program product comprising one or more computer-readable storage media, and program instructions stored on at least one of the one or more storage media, the stored program instructions comprising:
    program instructions to determine a subsequence of machines used and a cost of providing a subservice in response to a service request with a key;
    program instructions to determine a second cost of using the subsequence of machines to provide the subservice in response to a different service request with a different key;
    program instructions to compute, using a processor and a memory, a distance between the cost and the second cost, wherein the computing is executed while the subservice is operational;
    program instructions to form a value pair using the distance and a number of logged occurrences of the subsequence with the key;
    program instructions to output the processing of the service request for the key as a suspect for costing an improper computing cost of the service, when an aggregate distance in the value pair fails to exceed a threshold distance;
    program instructions to evaluate whether an aggregate number in the value pair exceeds a threshold count, the aggregate number using the number; and
    program instructions to output as the suspect, responsive to the evaluating being negative, the processing of the service request for the key, for using an improper sequence of machines during the provisioning of the service and causing an error.

14. The computer program product of claim 13, further comprising:
    program instructions to output as the suspect, when the aggregate distance fails to exceed the threshold distance and the aggregate number fails to exceed the threshold count, for forming an improper entry in the log during the provisioning of the service and causing an error.

15. The computer program product of claim 13, further comprising:
    program instructions to compute using another number and another distance, another value pair for another subsequence used in the processing of the service request for the key;

program instructions to combine the number and the other number to form the aggregate number; and program instructions to combine the distance and the other distance to form the aggregate distance.

16. The computer program product of claim 13, further comprising:

program instructions to apply, as a part of computing the value pair for the subsequence, a logarithm function to the number and the distance.

17. The computer program product of claim 13, further comprising:

program instructions to apply a weight to the distance.

18. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to determine a subsequence of machines used and a cost of providing a subservice in response to a service request with a key;

program instructions to determine a second cost of using the subsequence of machines to provide the subservice in response to a different service request with a different key;

program instructions to compute a distance between the cost and the second cost, wherein the computing is executed while the subservice is operational;

program instructions to form a value pair using the distance and a number of logged occurrences of the subsequence with the key;

program instructions to output the processing of the service request for the key as a suspect for costing an improper computing cost of the service, when an aggregate distance in the value pair fails to exceed a threshold distance;

program instructions to evaluate whether an aggregate number in the value pair exceeds a threshold count, the aggregate number using the number; and program instructions to output as the suspect, responsive to the evaluating being negative, the processing of the service request for the key, for using an improper sequence of machines during the provisioning of the service and causing an error.

\* \* \* \* \*